United States Patent [19]
Fujii et al.

[11] Patent Number: 5,505,290
[45] Date of Patent: Apr. 9, 1996

[54] WORKING SYSTEM FOR PRACTICING WORK ON MOVING SUBJECT WORKS

[75] Inventors: Hiroshi Fujii; Yukihiro Okinaka, both of Hiroshima, Japan

[73] Assignee: Mazda Motor Corporation, Hiroshima, Japan

[21] Appl. No.: 323,249

[22] Filed: Oct. 17, 1994

[51] Int. Cl.$^6$ .................................................. B65G 15/64
[52] U.S. Cl. ...................................... 198/345.1; 198/345.2
[58] Field of Search ................................... 198/341, 346.2, 198/346.3, 343.2, 345.2, 678.1, 683; 29/430, 33 P

[56] References Cited

U.S. PATENT DOCUMENTS

| | | | |
|---|---|---|---|
| 4,382,500 | 5/1983 | Oyama et al. | 198/346.2 X |
| 4,772,374 | 9/1988 | Urquhart et al. | 198/346.3 X |
| 4,924,996 | 5/1990 | Svensson et al. | 198/341 |
| 5,207,309 | 5/1993 | Simpkin et al. | 198/341 |
| 5,311,659 | 5/1994 | Barnhart et al. | 198/345.2 X |

FOREIGN PATENT DOCUMENTS

| | | |
|---|---|---|
| 1-35792 | 11/1989 | Japan. |
| 3-40386 | 8/1991 | Japan. |

*Primary Examiner*—James R. Bidwell
*Attorney, Agent, or Firm*—Keck, Mahin & Cate

[57] ABSTRACT

A working apparatus performs predetermined work on moving subject works carried by work carriers, which are coupled to and transported, one after another, by, a conveyor system. The apparatus holds a work carrier at a working station and releases mechanical coupling between the work carrier and the conveyor system upon a detection of a work carrier located in a predetermined position relative to the working station. The work carrier located at the working station is transported at a speed of the work carrier detected in the predetermined position independently from the conveyor system while performing the predetermined work on the subject work carried by the work carrier at the working station. Upon completion of the predetermined work, the work carrier is released so as to restore the mechanical coupling between the work carrier and the conveyor system.

7 Claims, 8 Drawing Sheets

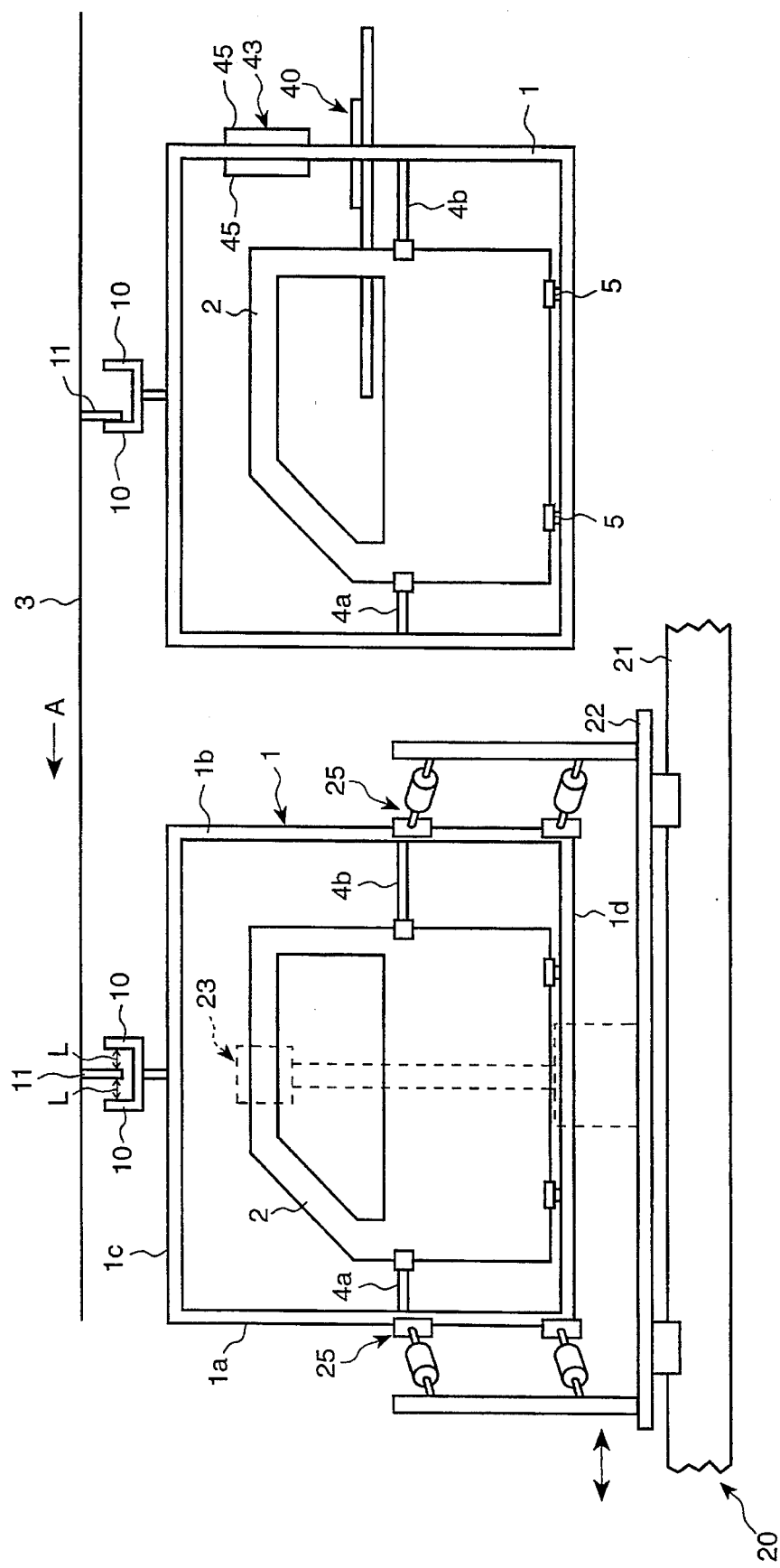

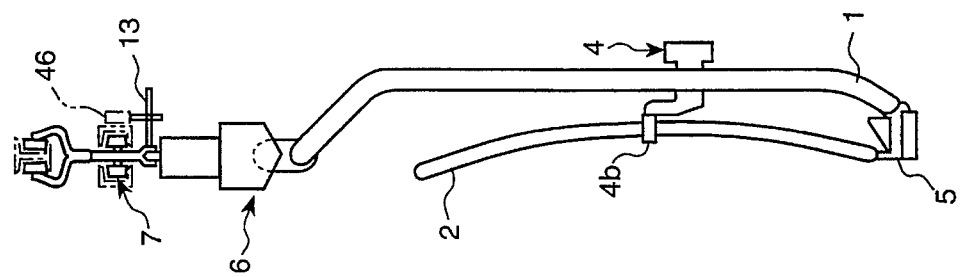
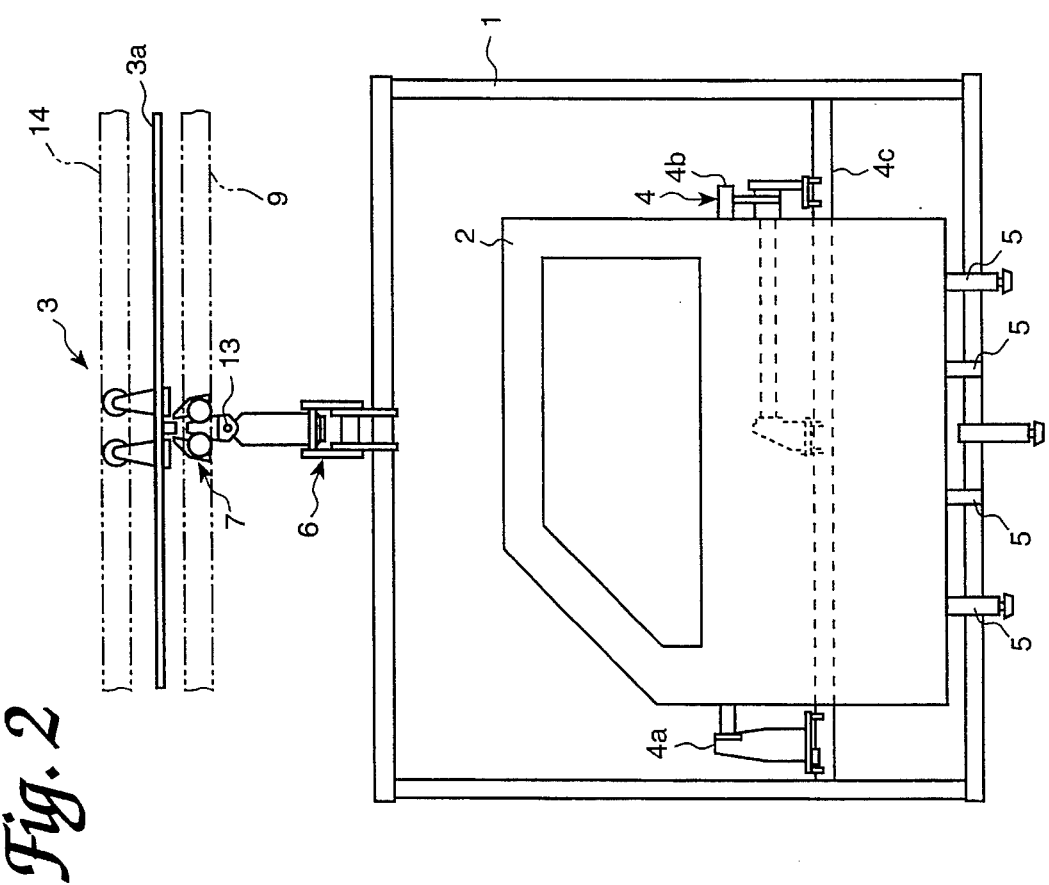

WORKING SYSTEM FOR PRACTICING WORK ON MOVING SUBJECT WORKS

BACKGROUND OF THE INVENTION

1. Field of the Invention

The present invention relates to a working system, including a working robot, for practicing predetermined work, machining, welding, assembling or the like on moving subject works.

2. Description of Related Art

In the course of increasing automation in a manufacturing line used to produce mechanical products, it has proven to be necessary also to automate and simplify the application of predetermined work, such as the application of adhesives, to subject works. Much attention has been given to various approaches relating to techniques of accurately keeping a predetermined relative position between a working apparatus or device, such as an automatic adhesive application gun, and a subject work. Because of differences in dimensions among surfaces of subject works due to manufacturing errors and also because of differences in transported positions due to operational differences among conveyor systems, it is difficult to make proper adhesive application onto predetermined points or parts of subject works. Various efforts have been made to place an automatic adhesive application gun in an appropriate position relative to surfaces of subject works in order to provide for optimum utilization of the automatic working apparatus.

One such effort is that described in Japanese Utility Model Publication No. 3-40386. The approach used was to correct the position of an adhesive application gun according to results of measurement of target points at which adhesive is applied to a subject work.

While the automatic working apparatus as described in the above publication may have advantages over the prior art, nevertheless, subject works must be stopped during the application of adhesive. This is not always desirable.

In Japanese Utility Model Publication No. 1-35792, a welding apparatus is provided which does not stop the transportation of subject works while performing predetermined work. For the purpose of providing a brief description of the operation of the prior art working apparatus that will enhance an understanding of the present invention, reference is made to FIGS. 8 and 9.

Referring to FIGS. 8 and 9, a conveyor 51, only schematically shown, transports a subject work, such as a vehicle body 53 placed on a pallet 52, to a working apparatus 54. When a post 55 extending vertically from the pallet 52 is detected by means of a sensor 56, a control unit 57 puts out a signal S1 for causing a clamp arm 58 to hold the post 55 with hands 59 and 60. Then, a support device 61 placed on a working table 63 is coupled to the pallet 52 and slides on the working table 63 together with the pallet 52. When the support device 61 and pallet 52 move as one whole to a position where a work sensor 62 detects the head of the vehicle body 53, the control unit 57 provides a drive signal S2 for actuating a motor 64 and a lock signal S3 for causing a switch valve 65 to be locked. The motor 64 moves the working table 63 in synchronism with the conveyor 51. On the other hand, when the switch valve 65 is locked, the support device 61 is fixed to the working table 63. Consequently, thereafter, the working table 63 moves together with the vehicle body 53 placed on the pallet 52. Then, the control unit 57 provides for a working robot 66 a control unit S4 so as to practice predetermined work, such as welding, on a predetermined point of the vehicle body 53 installed on the working table 63. A distance between the work sensor 62 and a position where the working robot 66 performs the predetermined work is previously fixed so as to be equal to a distance between the body head and the predetermined welding point of the vehicle body 53. Consequently, based on a output signal from the work sensor 62, the control unit 57 causes the motor 64 to provide a controlled movement of the working table 63. It is intended to provide an appropriate relative position between the vehicle body 53 and the working robot 66 through this controlled movement and thereby enable the application of adhesive to subject works at accurate points.

In the prior art working apparatus, which practices predetermined work on moving subject works, the working robot 66 is moved at a synchronous speed with the conveyor 51 so as to maintain a predetermined relative position between the working robot 66 and the subject work 53. However, as a practical matter, it is difficult to maintain the subject work 53, transported by the conveyor 51, and the working robot 66, driven by the drive motor 64, stationary with respect to each other while they are united as one whole. This is because the subject work 53 and working robot 66 are each adversely affected by the transportation means for the other. In addition, if a load on the working robot 66 for driving the working table 53 is large, it is hard to provide a precisely synchronized movement of the working table 53 with the subject work 53 transported by the conveyor 51.

SUMMARY OF THE INVENTION

It is an object of the present invention to provide a working system which can practice predetermined work precisely on moving subject works without being adversely affected by a conveyor system for the subject works.

The above object of the present invention is achieved by providing a working system for practicing, at a working station where a working apparatus is installed, predetermined work on moving subject works carried by work carriers which are transported one after another, by a conveyor system. The working apparatus, such as one including a working robot, holds a work carrier carrying a subject work which has reached the working station and releases mechanical coupling between the work carrier and the conveyor system when a work carrier is detected as being located in a predetermined position relative to the working station, such as a position in which a work carrier following the work carrier located at the working station is placed when the work carrier is correctly located at the working station. Then, the working apparatus transports the work carrier located at the working station at a speed of the work carrier detected in the predetermined position independently from the conveyor system while the working apparatus is practicing the predetermined work on the subject work carried by the work carrier located at the working station. Upon a completion of the predetermined work, the working apparatus releases the work carrier so as to restore the mechanical coupling between the work carrier and the conveyor system.

With the working system of the present invention, a coupling means between each work carrier and the conveyor system provides mechanical coupling between the work carrier and the conveyor system until the work carrier reaches the working station. The coupling means releases the mechanical coupling between the work carrier and the conveyor system when the working apparatus holds the work carrier. After having released the mechanical coupling, the working apparatus practices the predetermined work on the subject work carried by the work carrier moving the work carrier in synchronism with but mechanically independently from the conveyor system. Accordingly, the subject work is kept in a predetermined position relative to the working apparatus, without being affected by the conveyor system, so that the predetermined work is precisely practiced on the subject work.

A speed detection means is related not to a work carrier placed at the working station but to a work carrier following after the work carrier located at the working station. In other words, it is not necessary to install the speed detection means in the working apparatus. This decreases a load on the motor for driving the working apparatus and makes it easy to move the working apparatus in synchronism with but independently from the conveyor system.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 1 is a schematic illustration showing a working system in accordance with a preferred embodiment of the present invention;

FIG. 2 is a schematic front view of a work carrier suspended from a conveyor system through a hanger;

FIG. 3 is a schematic side view of the work carrier of FIG. 2;

DESCRIPTION OF THE PREFERRED EMBODIMENTS

Figure 4B:
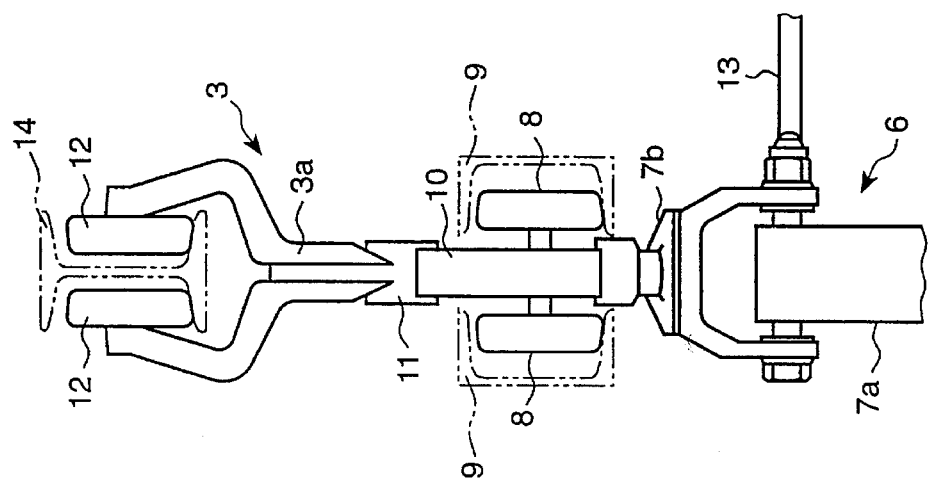
FIG. 4B is a side view of the hanger means of FIG. 4A.

Referring now to the drawings in detail and, in particular, to FIGS. 1 to 3, a working system for practicing predetermined work on a moving subject work in accordance with a preferred embodiment of the present invention is shown. The system may, for instance, be an automatic adhesive application system for automatically applying an adhesive to an automotive vehicle door to which a sheet is adhered for waterproofing. The automatic adhesive application system includes a conveyor system 3, only schematically shown, from which a plurality of generally rectangularly shaped carrier frames 1 are hung by means of coupling hanger assemblies 6. The conveyor system conveys these carrier frames 1, one after another, in a lengthwise direction shown by an arrow A. These coupling hanger assemblies 6 are provided at regular intervals of approximately 2 m. Each carrier frame 1 carries a vehicle door 2 as a subject work. The carrier frame 1 for carrying the vehicle door 2 is comprised of front and rear side frame members 1a and 1b and upper and lower frame members 1c and 1d. The carrier frame 1 is provided with a holding device 4 including a stationary front holding arm 4a secured to a cross beam 4c and a movable rear holding arm 4b secured to the cross beam 4c. The carrier frame 1 is further provided with a plurality of shoes 5, some of which are adjustable, attached to the lower frame member 1d. The vehicle door 2 is placed on the support shoes 5 and then held by and between the front and rear holding arms 4a and 4b.

This conveyor system 3 includes a motor driven conveyor chain 3a, a chain guide rail 14 and a carrier guide rail 9. These guide rails 14 and 9 extend in the lengthwise direction A on upper and lower sides of the conveyor chain 3a, respectively, and in parallel with the conveyor chain 3a. The conveyor chain 3a is driven in the lengthwise direction A at a constant speed of, for instance, 2.4 m/min. by means of a motor (not shown).

Figure 4A:
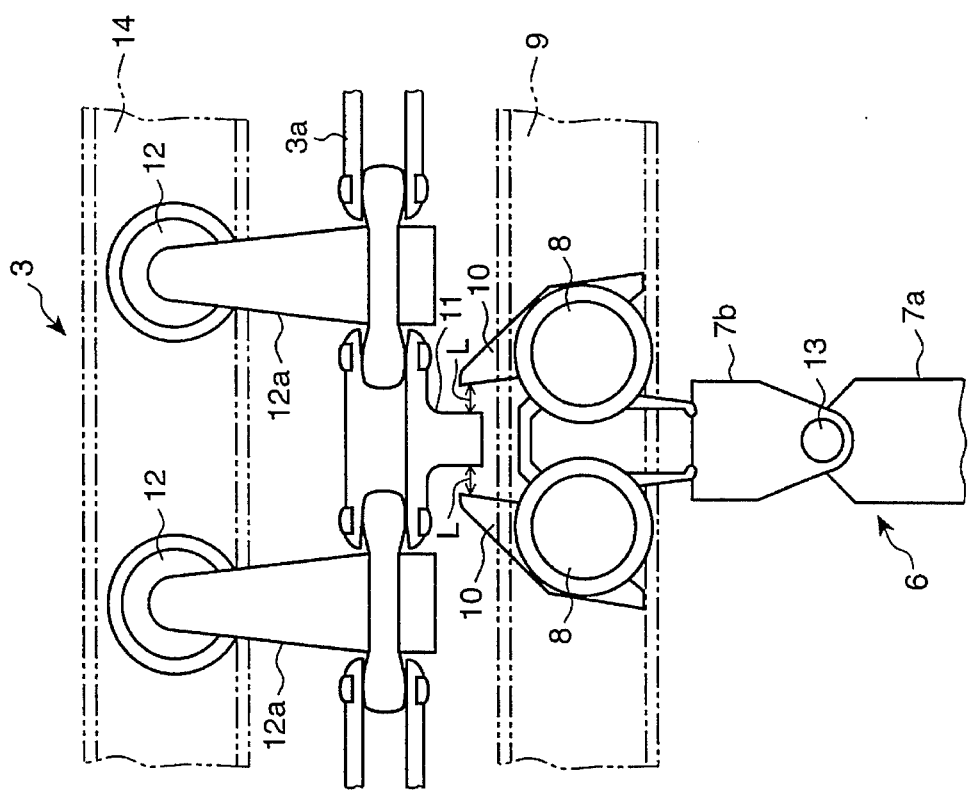
FIG. 4A is a front view of a hanger means.

Referring to FIGS. 4A and 4B, each coupling hanger assembly 6 includes a pair of brackets 12a secured to the conveyor chain 3a and a coupling strut 11 secured to the conveyor chain 3a and having a lengthwise thickness of about 30 mm. Each bracket 12a extends upward from the conveyor chain 3a and is provided with a pair of guide rollers 12 which are supported for rotation by the chain guide rail 14 so as to suspend the conveyor chain 3a for movement. The coupling strut 11 extends downward from the conveyor chain 3a. The coupling hanger assembly 6 further includes a connecting bracket 7a secured to, or formed integrally with, the middle of upper frame member 1c and a hanger slide 7b connected to the connecting bracket 7a by means of a connecting pin 13 extending horizontally and perpendicularly to the lengthwise direction A. The hanger slide 7b supports for rotation two pairs of guide rollers 8 which are supported for rotation by the carrier guide rails 9 so as to suspend the carrier frame 1 for movement. The hanger slide 7b is integrally formed with a pair of, namely front and rear, jaws 10 which are separated at a distance of, for instance, 70 mm. in the lengthwise direction A so as to receive the coupling strut 11 therebetween. Because the carrier frame 1 and the conveyor chain 3a are independently suspended from the guide rails 9 and 14, respectively, the coupling strut 11 can shift in position between the jaws 10. When the coupling strut 11 is at the middle between the jaws 10, a lengthwise separation L, which is about 20 mm., is provided between the coupling strut 11 and each jaw 10. When the conveyor chain 3a moves in the lengthwise direction A, the coupling strut 11 is brought into contact with the front jaw 10 and forces the hanger slide 7b forward, so as to move the carrier frames 1 in the lengthwise direction A with the regular distances of about 2 m. kept between each adjacent carrier frames 1.

Figure 5:
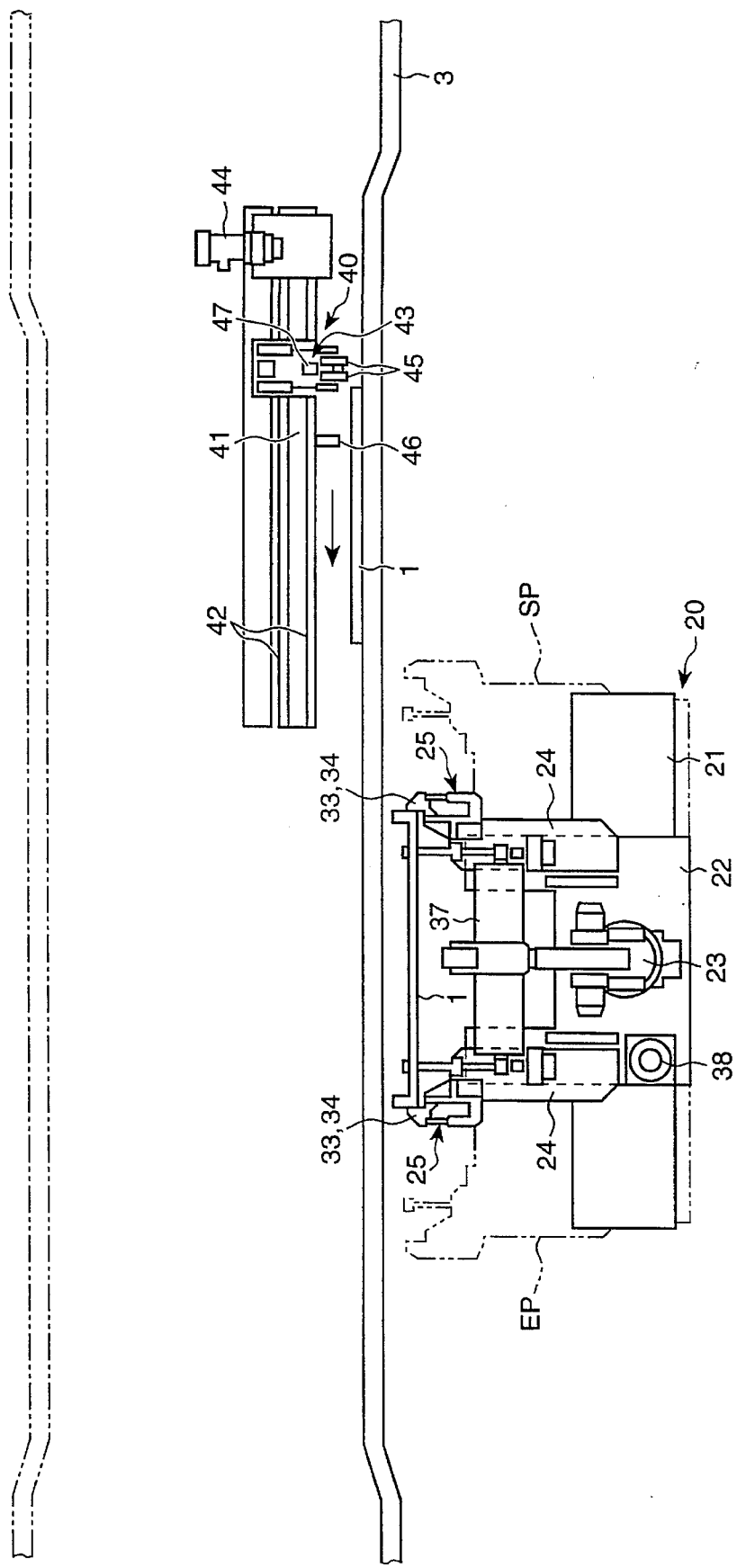
FIG. 5 is a schematic plan view of a working apparatus.
Figure 6:
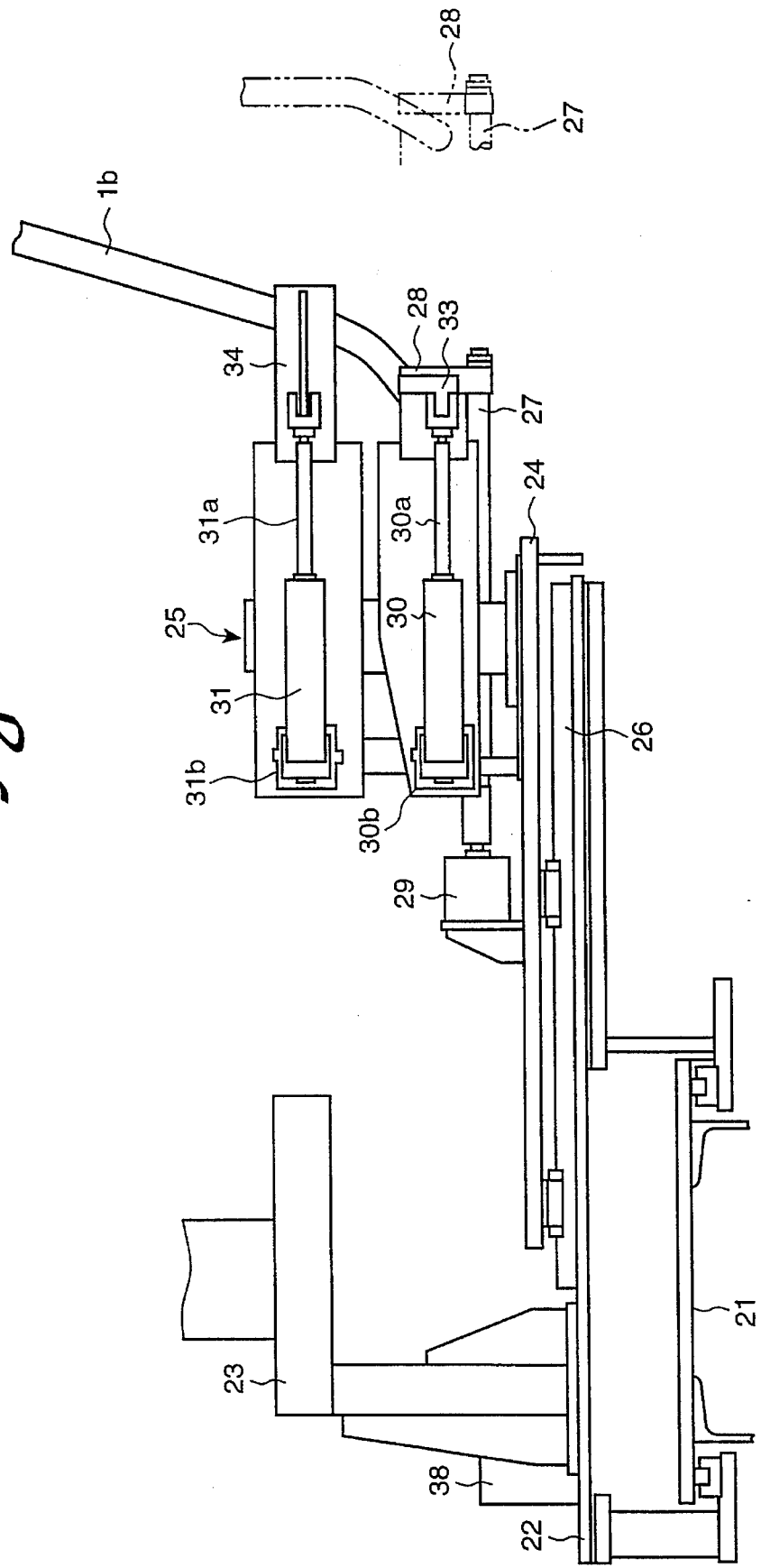
FIG. 6 is a detailed side view of the working apparatus.

Referring to FIGS. 5 and 6 in connection with FIG. 1, at a predetermined position in the lengthwise direction, there is installed a working station, such as an adhesive application station 20, where an adhesive application robot 23 as a working apparatus is mounted on a base 21. Specifically, the adhesive application robot 23 is stationarily placed on a slide table 22 mounted for slide movement in the lengthwise direction A on the fixed base 21. On the slide table 22, there are mounted a pair of slide plates 24 for sliding movement in a transverse direction perpendicular to the lengthwise direction A and extending vertically therefrom. Each of the slide plates 24 is provided with a pair of, namely front and rear, clamp devices 25. In more detail, as shown in FIG. 6, the slide table 22, which is slidable with respect to the fixed base 21 in the lengthwise direction A and on which the adhesive application robot 23 is fixedly mounted, is driven by means of a working apparatus drive motor 38 at a synchronous speed with the conveyor chain 3a. On the slide table 22, there is further provided a guide rail 26 extending in the transverse direction, perpendicular to the lengthwise direction A on which the slide plate 24 is mounted, so as to slide toward and away from the carrier frame 1. The slide plate 24 mounts thereon either one of front and rear clamp devices 25 and a motor 29 having an output shaft 27 which extends toward the carrier frame 1. The output shaft 27 is provided at its free end with a retainer arm 28 so as to change its position between a horizontal position and a vertical position.

Figure 7:
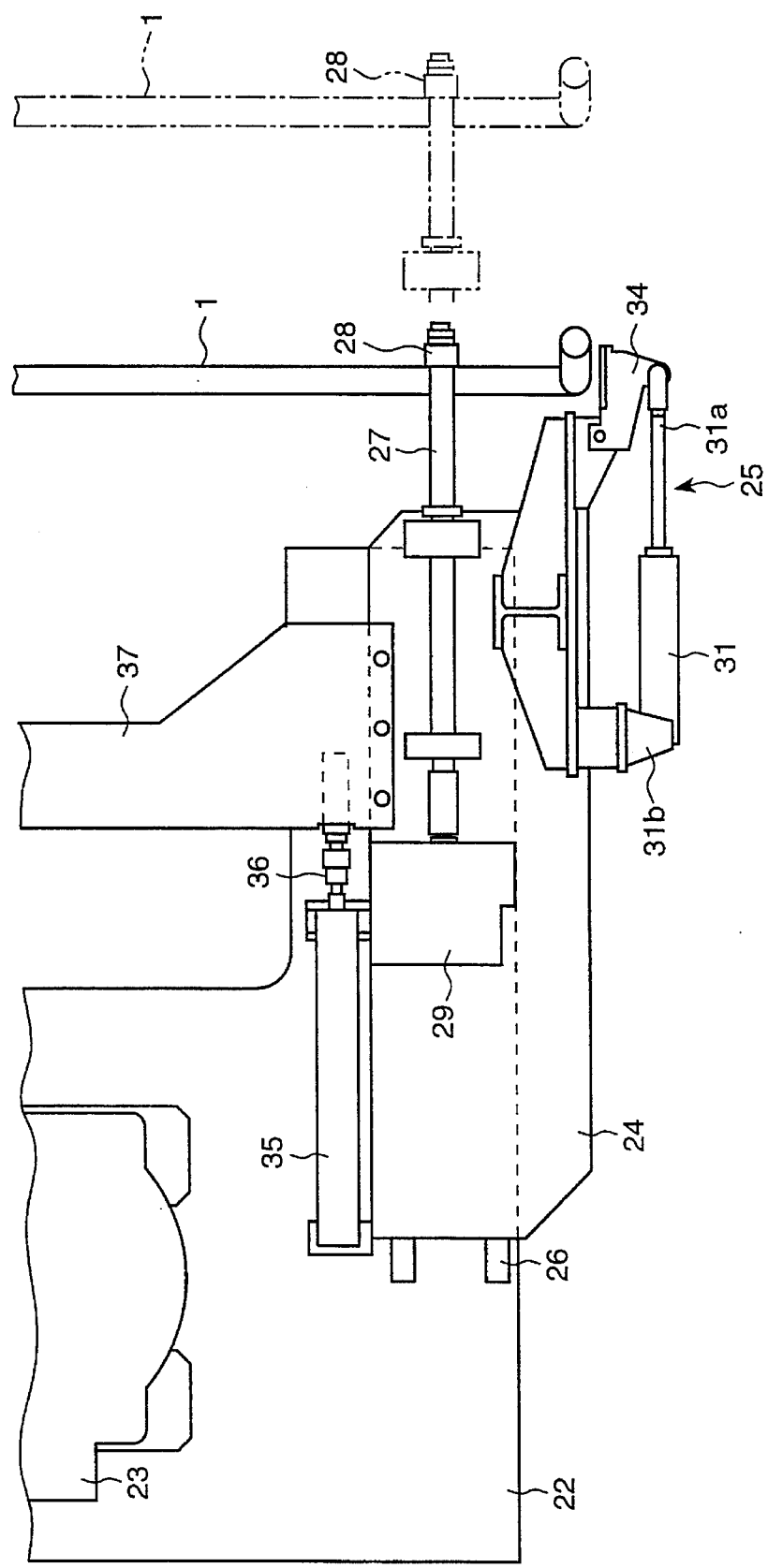
FIG. 7 is a detailed plan view of an essential part of the working apparatus.
Figure 8:
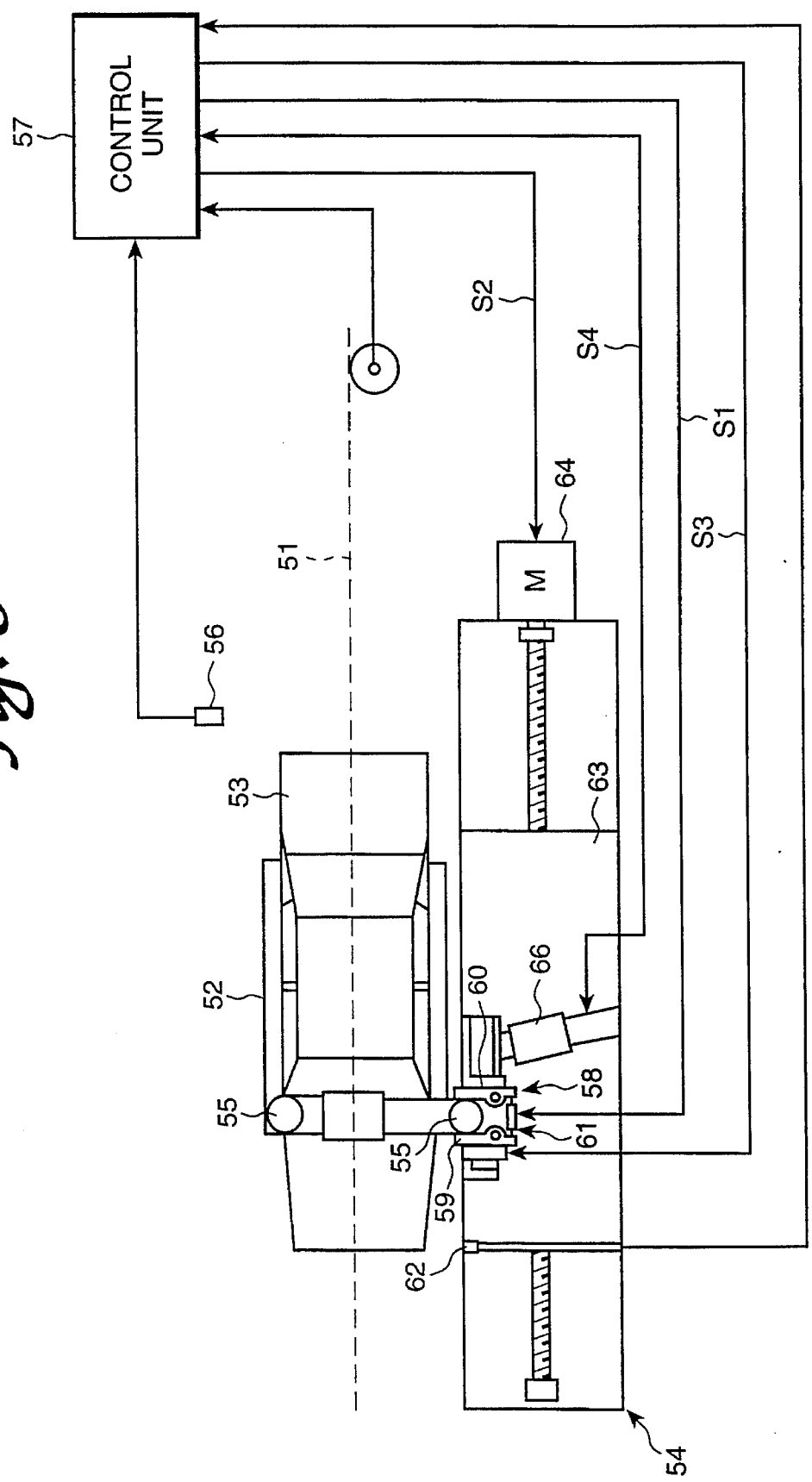
FIG. 8 is a plan view of a prior art working system.
Figure 9:
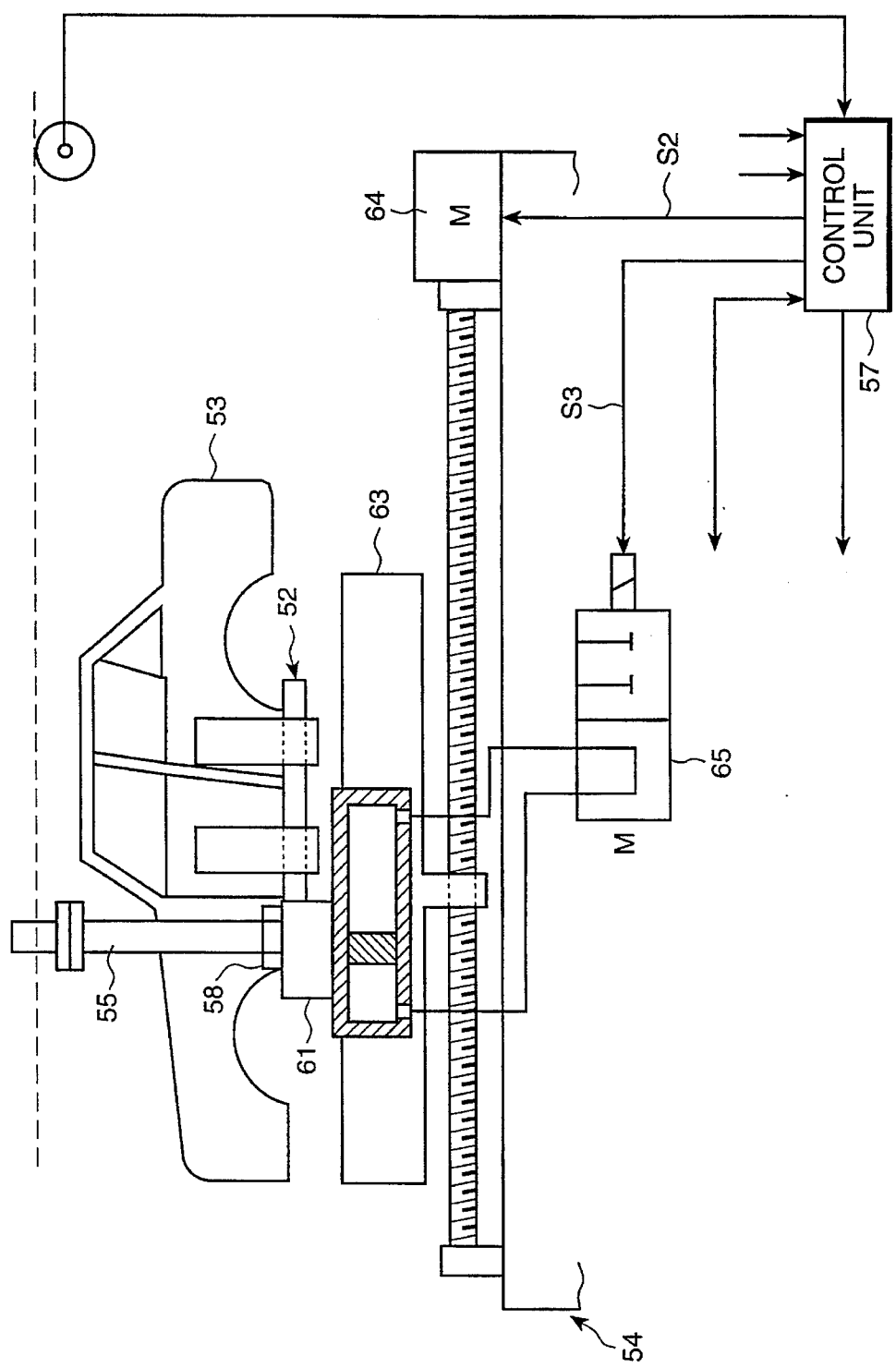
FIG. 9 is a front view of the prior art working system

The rear clamp device 25 includes lower and upper clamp arms 33 and 34 which are operated by air cylinders 30 and 31, respectively, so as to hold the side frame member 1a or 1b at two points. In more detail, as shown in FIG. 7, these clamp arms 33 and 34 are pivotally secured at first ends to free ends of cylinder rods 30a and 31a and at second ends to a stationary portion of the clamp device 25. Further, the air cylinders 30 and 31 are pivotally supported at their ends remote from the cylinder rods 30a and 31a by brackets 30b and 31b. With the clamp device 25 thus structured, when the air cylinders 30 and 31 are activated to cause the cylinder rods 30a and 31a, respectively, to protrude, both clamp arms 33 and 34 are forced to turn counterclockwise as viewed in FIG. 7 so as to force the side frame member 1b forward in the lengthwise direction A and hold the same. As a result, the carrier frame 1 is forced forward in the lengthwise direction A. In addition, the slide plate 22 is provided with an air cylinder 35 having a cylinder rod 36 which is secured at its free end to a connecting blade 37 extending and secured to a counter part of the front clamp device 25 which is similar in structure to the rear clamp device 25. Consequently, when the front and rear air cylinders 35 are activated to protrude their cylinder rods 36, respectively, the connecting blade 37 is forced so as to move the slide plates 24 toward the carrier frame 1.

As is shown in FIG. 5, there is provided a carrier frame detection device 40 in a position where a carrier frame 1, which follows directly after the carrier frame 1 at the adhesive application station 20, is located when the carrier frame 1 is correctly located at the adhesive application station 20. This carrier frame detection device 40 detects a transported position and a moving speed of the carrier frame 1 at the adhesive application station 20. The carrier frame detection device 40 includes a stationary guide table 41 extending in parallel with the conveyor chain 3a on which parallel guide rails 42 are fixedly placed. The detection device 40 includes a speed detector 43 slidable on the parallel guide rails 42 for detecting a moving speed of the following carrier frame 1, a carrier position detector switch 47 for detecting the following carrier frame 1, and a return motor 44 for returning the detection device 40 to an initial position when the speed detector 43 has moved a predetermined distance in the lengthwise direction A. In addition, the detection device 40 has a limit switch 46 for determining a time at which the following carrier frame 1 has to be inclined. The speed detector 43 is provided with a pair of, namely front and rear, clamp arms 45 for holding the following carrier frame 1 transported to the side of the detection device 40. When the clamp arms 45 hold the following carrier frame 1 and the carrier position detector switch 47 is caused to turn on, the preceding carrier frame 1 is at a regular interval of approximately 2 m. from the adhesive application robot 23. After the clamp arms 45 has held the carrier frame 1, the carrier frame detection device 40 and the carrier frame 1 are mechanically united together so as to move as one whole. During this movement, the carrier frame detection device 40 detects its own speed as the speed of carrier frame 1. For speed detection, the carrier frame detection device 40 may contain, for instance, a gear train for calculating a speed based on the rotation speeds of gears. Turning on of the carrier position detector switch 47 causes the working apparatus drive motor 38 to rotate at a synchronous speed with the conveyor chain 3a.

In operation of the working apparatus thus structured, while the conveyor system 3 moves in the lengthwise direction A, each hanger assembly 6 brings the coupling strut 11 in engagement with the front jaw 10, forcing a carrier frame 1 forward in the lengthwise direction. When any of the carrier frames 1 reaches the speed detector 43 of carrier frame detection device 40 at the initial position and is contacted by the front clamp arm 45 of speed detector 43, the carrier position detector switch 47 turns on, causing the clamp arms 45 to hold the carrier frame 1, thereby mechanically uniting the carrier frame detection device 40 and the carrier frame 1 together as one whole. While the carrier frame detection device 40 moves together with the carrier frame 1, it detects a speed of the carrier frame 1. Upon turning on of the carrier position detector switch 47, the carrier frame 1, detected by the carrier frame detection device 40, is located at a regular interval of approximately 2 m. from a preceding carrier frame 1. Accordingly, turning the carrier position detector switch 47 on indicates that the preceding carrier frame 1 is correctly located at the adhesive application station 20.

At this time, in the adhesive application station 20, the working apparatus drive motor 38 is driven so as to move the slide table 22 at a synchronous speed with the conveyor chain 3a in the lengthwise direction A from the initial position SP shown by double-dotted line in FIG. 5. Simultaneously, the air cylinder 35 is activated to protrude its cylinder rod 36, respectively, so as to apply force to the connecting blade 37, thereby moving the slide plates 24 toward the carrier frame 1. Subsequently, the air cylinders 30 and 31 are activated to protrude the cylinder rods 30a and 31a, respectively, so as to force both clamp arms 33 and 34 to turn counterclockwise as viewed in FIG. 7, thereby forcing the carrier frame 1 by a distance of, for instance, 10 mm. forward in the lengthwise direction A and hold it. As a result, as shown in FIG. 1, the hanger slide 7b shifts forward approximately 10 mm., so as to displace the front jaw 10 away from the coupling strut 11 and the rear jaw 10 close to the coupling strut 11 and to place the coupling strut 11 left in an in-between position between the front and rear jaws 10. In other words, the carrier frame 1 is mechanically disconnected from the conveyor chain 3a. While leaving the coupling strut 11 in the in-between position, since the carrier frame 1 has been held by the clamp arms 34 moving in the lengthwise direction A together with the slide table 22 driven at a synchronous speed with the conveyor chain 3a by the working apparatus drive motor 38, it moves in the lengthwise direction A at a synchronous speed with the conveyor chain 3a.

When the limit switch 46 of carrier frame detection device 40 is brought into contact with the pivot pin 13 connecting the connecting bracket 7a and the hanger slide 7b, it turns on, on one hand, to cause the motor 29 to turn up the retainer arm 28 from the horizontal position to the vertical position so that the retainer arm 28 retains the carrier frame 1 and, on the other hand, to deactivate the air cylinders 35 to retract their cylinder rods 36, respectively, so as to pull the connecting blade 37 back, thereby moving the slide plates 24 away from the carrier frame 1. As a result, the carrier frame 1 is inclined with respect to a vertical plane at an angle sufficient to prevent an adhesive applied to the vehicle body 2 from oozing. Thereafter, the adhesive application robot 23 is caused to apply adhesive to predetermined points or surfaces of the vehicle door 2 held by the carrier frame 1 moving at a synchronized speed.

After the application of adhesive, the air cylinders 35 are activated again to protrude their cylinder rods 36, respectively, so as to force the slide plates 24 toward the carrier frame 1, thereby returning the carrier frame 1 to a vertical position. Immediately thereafter, the air cylinders 30 and 31 are deactivated to retract the cylinder rods 30a and 31a, respectively, so as to turn back the clamp arms 33 and 34, thereby releasing and moving back the carrier frame 1 rearward. Consequently, the hanger slide 7b shifts backward approximately 10 mm. and brings the front jaw 10 into contact with the coupling strut 11, providing mechanical coupling between the coupling strut 11 and hanger slide 7b of the hanger assembly 6. Thus, the carrier frame 1 is mechanically united with the conveyor system 3 together and, consequently, transported by the conveyor system 3. On the other hand, when the slide table 22 reaches a terminal position EP, shown by double-dotted line in FIG. 5, where the adhesive application robot 23 has completed the adhesive application work on the carrier frame 1, the working apparatus drive motor 38 is reversely driven so as to move back the slide table 22 to the initial position SP and, simultaneously, the return motor 44 is driven so as to return the detection device 40 to the initial position. In this way, the working apparatus becomes ready for adhesive application work on another vehicle body 2.

With the working apparatus of the present invention, before performing predetermined work on a subject work, the hanger assembly 6 mechanically couples the carrier frame 1, carrying a subject work, and the conveyor system 3 together so that the carrier frame 1 is transported by the conveyor system 3. When the carrier frame 1 reaches a predetermined position before the working station 20, the hanger assembly 6 allows release of the mechanical coupling between the carrier frame 1 and the conveyor system 3 so as to enable the carrier frame 1 to move together with the automatic working apparatus, such as a working robot, as one whole by means of the operation of the working apparatus drive system independent from but synchronized with the conveyor system. Simultaneously, the carrier frame 1 is shifted backward with respect to the conveyor system 3 so as to release the mechanical coupling between the carrier frame 1 and the conveyor system 3. Thereafter, until the completion of predetermined work, the carrier frame 1 is transported by the working apparatus drive system independently from but at a speed which is synchronized with the conveyor system, with the subject work carried by the carrier frame being subjected to the predetermined work.

While performing the predetermined work on a subject work carried by the carrier frame at the working station, the subject work is not only independent from the conveyor system but also kept stationary relative to the working apparatus. Therefore, the working apparatus performer precisely predetermined work on correct points or parts of the subject work.

As substitution for position and speed of a carrier frame 1 located at the working station, the carrier frame detection device 40, which is disposed not on the slide table 22 at the working station but before the working station, detects position and speed of a following carrier frame 1 following directly after the carrier frame 1 when the carrier frame 1 is at the adhesive application station 20. This disposition of the carrier frame detection device 40 decreases a load on the slide table 22 which bears and moves, as its load, heavy structural elements, such as a working apparatus and the carrier frame with a subject work, preventing the working apparatus drive motor 38 from being subjected to a heavy load and, consequently, non-synchronous operation. If the working apparatus drive motor 38 loses its synchronism with the conveyor system and, as a result, the hanger slide 7b is allowed to shift forward more than approximately 10 mm., the hanger slide 7b potentially will bring the rear jaw 10 into contact with the coupling strut 11. This may provide undesirable mechanical coupling between the coupling strut 11 and hanger slide 7b of the hanger assembly 6. Such undesirable coupling causes an adverse influence of fluctuations in speed of the conveyor system relative to the carrier frame. In contrast to this, with the working apparatus of the present invention, wherein the carrier frame detection device 40 is not disposed on the slide table 22, well synchronized cooperation takes place between the working apparatus and the conveyor system, keeping the coupling strut 11 certainly placed, in an in-between position, between the front and rear jaws 10.

It is to be understood that although the present invention has been described with regard to preferred embodiments thereof, various other embodiments and variants may occur to those skilled in the art which are within the scope and spirit of the invention. Such other embodiments and variants are intended to be covered by the following claims.

What is claimed is:

1. A working system for performing, at a working station, predetermined work on subject works carried by subject work carriers which are transported, one after another, by a conveyor system, said working system comprising:

coupling means provided between each of said subject work carriers and said conveyor system for providing mechanical coupling between each of said subject work carriers and said conveyor system;

detection means for detecting when one of said subject work carriers is placed in a predetermined position relative to said working station and detecting a speed at which said one of said subject work carriers is transported by said conveyor system from said predetermined position; and a working apparatus placed at said working station for holding said one of said subject work carriers at said working station so as to disable said coupling means of said one of said subject work carriers at said working station to provide said mechanical coupling upon a detection of said one of said subject work carriers in said predetermined position with said detection means, transporting said one of said subject work carriers at said working station at a speed detected by said detection means independently from said conveyor system while said working apparatus is performing said predetermined work on a subject work carried by said one of said subject work carriers at said working station, and releasing said one of said subject work carriers at said working station upon a completion of said predetermined work so as to restore said mechanical coupling provided by said coupling means.

2. A working system as defined in claim 1, wherein said coupling means comprises a coupling strut secured to said conveyor system and a hanger secured to each of said subject work carriers and being engaged with said coupling strut in a direction of transportation so as to provide said mechanical coupling.

3. A working system as defined in claim 2, wherein said conveyor system includes a motor driven conveyor chain, chain guide means to which said coupling strut is secured for guiding said conveyor chain in said direction of transportation, and hanger guide means for guiding said hanger in said direction of transportation independently from said conveyor chain.

4. A working system as defined in claim 2, wherein said working apparatus includes a plurality of holding arms for forcing said one of said subject work carriers at said working station forward in a direction of transportation so as to release said mechanical coupling and then holding said one of said subject work carriers at said working station.

5. A working system as defined in claim 1, wherein said detection means is disposed aside a position at which said one of said subject work carriers, following after another one of said subject work carriers placed at said working station, is placed when the other one of said subject work carriers is correctly placed at said working station.

6. A working system as defined in claim 1, wherein said detection means detects said one of said subject work carriers following after another one of said subject work carriers placed at said working station and a speed of the other one of said subject work carriers.

7. A working system as defined in claim 1, wherein said detection means includes coupling means for coupling said detection means to said one of said subject work carriers following after any other of said subject work carriers placed at said working station together when said detection means detects said one of said subject work carriers as to render said detection means movable together with said one of said subject work carriers as one unit, said detecting means detecting a speed of said one of said subject work carriers while moving together with said one of said subject work carriers.

* * * * *

UNITED STATES PATENT AND TRADEMARK OFFICE
CERTIFICATE OF CORRECTION

PATENT NO.   : 5,505,290
DATED        : Apr. 9, 1996
INVENTOR(S)  : Fujii, et al It is certified that error appears in the above-identified patent and that said Letters Patent is hereby corrected as shown below:

On title page, insert item [30] to read as follows:
--[30]  Oct. 15, 1993  [JP] Japan..........................5-258250--

Signed and Sealed this

Eleventh Day of August 1998

Attest:

BRUCE LEHMAN

*Attesting Officer*          *Commissioner of Patents and Trademarks*